(12) United States Patent
Sainty

(10) Patent No.: US 10,691,222 B1
(45) Date of Patent: *Jun. 23, 2020

(54) METHODS AND SYSTEMS FOR HANDS FREE CONTROL IN A VIRTUAL WORLD

(71) Applicant: Charles Henry Alastair Sainty, New York, NY (US)

(72) Inventor: Charles Henry Alastair Sainty, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/371,632

(22) Filed: Apr. 1, 2019

Related U.S. Application Data

(63) Continuation of application No. 15/584,452, filed on May 2, 2017, now Pat. No. 10,289,207.
(60) Provisional application No. 62/330,900, filed on May 3, 2016.

(51) Int. Cl.
| | |
|---|---|
| *G06F 3/033* | (2013.01) |
| *G06F 3/01* | (2006.01) |
| *A63F 13/214* | (2014.01) |
| *A63F 13/22* | (2014.01) |
| *A63F 13/428* | (2014.01) |
| *A63F 13/211* | (2014.01) |
| *A63F 13/218* | (2014.01) |
| *G06T 3/20* | (2006.01) |
| *G06T 13/40* | (2011.01) |
| *G06F 3/0346* | (2013.01) |
| *G06T 3/60* | (2006.01) |

(52) U.S. Cl.
CPC .............. *G06F 3/017* (2013.01); *G06F 3/011* (2013.01); *G06F 3/0346* (2013.01); *G06T 3/20* (2013.01); *G06T 3/60* (2013.01); *G06T 13/40* (2013.01)

(58) Field of Classification Search
CPC ........ G06F 3/0334; G06F 3/033; G06F 3/011; G06F 3/0346; G06F 3/017; G06F 3/04815; A63F 13/214
See application file for complete search history.

(56) References Cited

U.S. PATENT DOCUMENTS

| | | | | |
|---|---|---|---|---|
| 7,648,404 | B1* | 1/2010 | Martin | B63B 35/7936 114/39.19 |
| 8,734,157 | B1* | 5/2014 | Hummel, III | A63F 13/00 434/247 |
| 2010/0245365 | A1* | 9/2010 | Hato | A63F 13/10 345/473 |
| 2011/0065496 | A1* | 3/2011 | Gagner | G07F 17/3209 463/25 |

(Continued)

OTHER PUBLICATIONS

Wii RVL-024(it is in the file of Parent U.S. Appl. No. 15/584,452), Mar. 2016 (Year: 2016).*

*Primary Examiner* — Md Saiful A Siddiqui
(74) *Attorney, Agent, or Firm* — Myers Wolin, LLC

(57) ABSTRACT

Systems and methods are provided to allow a user to use their feet as an alternative to their hands as a source of input for motion control. Such a method may be provided comprising receiving orientation data representing orientation information for a controller manipulated by a user, receiving movement data representing dynamic information for the controller, evaluating at least one of the orientation data and the movement data, and moving an avatar in a direction based on the direction in which the controller is moved. The method can be implemented in a software application or across multiple software applications on different platforms.

12 Claims, 6 Drawing Sheets

(56) References Cited

U.S. PATENT DOCUMENTS

2013/0344926 A1* 12/2013 Claudel ................ A63B 22/16
 463/7
2016/0054837 A1* 2/2016 Stafford ................ G06F 3/012
 463/33
2017/0185168 A1* 6/2017 Bonora ................ G06F 3/011

* cited by examiner

METHODS AND SYSTEMS FOR HANDS FREE CONTROL IN A VIRTUAL WORLD

CROSS-REFERENCE TO RELATED APPLICATION

This application is a continuation of U.S. patent application Ser. No. 15/584,452, filed May 2, 2017, which claims the benefit of U.S. Provisional Patent Application No. 62/330,900, filed May 3, 2016, the contents of each of which are incorporated by reference herein in their entirety.

FIELD OF THE INVENTION

The invention relates to methods and systems for hands free control for computer systems, such as hands free game controllers and control schemes, as well as methods for implementing such hands free control and control schemes.

BACKGROUND

A system and method for the use of smartphones or tablets to detect the motion of a user's foot and send that information to be translated into virtual motion over a wireless network is described. As hand tracking technology improves, as virtual reality devices are released commercially, and as more applications are developed that incorporate the use of hand tracking, there is an increased need for hands free control schemes and systems and methods for implementing such schemes.

Modern virtual reality headsets allow for new levels of user immersion into computer software, such as virtual worlds and video games. Further, new controllers, such as the Leap Motion, allow for the detection of human hands, and allow software to translate the motion of human hands into various actions. That type of advancement in control systems within virtual reality can, for example, create representations of virtual hands, as part of a user avatar that can mimic the motion of and use of a user's own hands inside a virtual environment. Because this use is viewed from within a motion-sensitive headset, the combination can assist in providing the illusion of physical presence in a virtual world.

However, such an illusion can be shattered once a user begins to move within the virtual environment, since modern schemes for controlling user movement typically require the use of the user's hands. Conventional control schemes, such as hand held controllers, mouse and keyboard key combinations, or joysticks, all require use of the users hands. Accordingly, without a hands-free control scheme, the user would be unable to navigate a virtual world while enjoying virtual control of their hands through hand tracking.

Alternative control schemes are known, such as those utilizing a user's feet, or full body virtual reality systems. These control schemes typically require expensive hardware, often costing as much or more than the modern game consoles they can be used with, to detect a user's motion and convert it to traditional control signals. Such solutions typically require hardware with specialized sensors and buttons to initiate some motions. For example, a button on the bottom surface of a foot controlled device may be required to detect if a user has pushed downward to initiate a jump or crouch. Further, such hardware may require on board processing software implemented such that the output of the system takes the form of a traditional control scheme, which can be resource intensive.

There is a need for systems and methods for implementing a control scheme that allows a user to utilize body parts other than their hands to control their movement within a virtual environment. Such systems and methods should not require expensive hardware solutions, and would ideally be implemented on devices user's already own and use.

SUMMARY

Systems and methods are provided to allow a user to use their feet as an alternative to their hands as a source of input for motion control. Thinking of a conventional joystick as well as the limitations of human feet, solutions allow for the detection of the tilt and rotation of the user's foot and translate those values into their motion and orientation, respectively, within a virtual space. Such a method can be implemented in smartphones and tablets which may contain the necessary hardware to detect tilt and rotation and send that information over a wireless network in real time. The method can be implemented in a software application or across multiple software applications on different platforms.

Such a method may be provided comprising receiving orientation data representing orientation information for a controller manipulated by a user, receiving movement data representing dynamic information for the controller, evaluating at least one of the orientation data and the movement data, and moving an avatar in a direction based on the direction in which the controller is moved.

In such a method, an avatar may be moved in a forward direction in a virtual environment if the orientation data represents a deviation from an initial orientation by a threshold amount in a first direction, and in a direction opposite the forward direction in the virtual environment if the orientation data represents a deviation from the initial orientation by the threshold amount in a second direction opposite the first direction. Similarly, the method translates the avatar to its left or right in the virtual environment if the orientation data represents a deviation from the initial orientation by the threshold amount in a direction perpendicular to the first direction and the second direction and may rotate the avatar to its left or right in the virtual environment if the movement data represents a movement greater than a threshold amount.

In some embodiments, the method may further comprise instructing the avatar to jump forward in the virtual environment if the orientation data represents a deviation from the initial orientation by at least the threshold amount in the second direction followed by a deviation in the first direction within a predetermined time period.

In some embodiments, the orientation data may be from an accelerometer and the movement data may be from a gyroscope. A speed of the movement of the avatar may be based on an amount by which one of the movements above exceeds the threshold amount.

Such an app may require some hardware used in conjunction with a smartphone or tablet to be effectively secured to, or otherwise usable by, a user. For example, a strap may be provided for securing a smartphone to the user's foot or a balance board may be provided on which the device can be secured and that the user can manipulate. Such hardware is typically minimal and does not require sensors.

In some embodiments, a system may be provided for displaying the movement of the avatar in the context of the virtual environment and for controlling the avatar based on data received from the controller. In such an embodiment, the system implements the method described above in a computing device and displays the results. Such a system may include a balance board for retaining the controller or a strap for fastening the controller to a user's foot. The system may further comprise a detector for detecting motion of a user's hand, while the controller detects movement of a user's foot. In some embodiments, the avatar's hands may be moved in accordance with movement of the user's hand as detected by the detector.

DETAILED DESCRIPTION OF THE PREFERRED EMBODIMENTS

Figure 1:
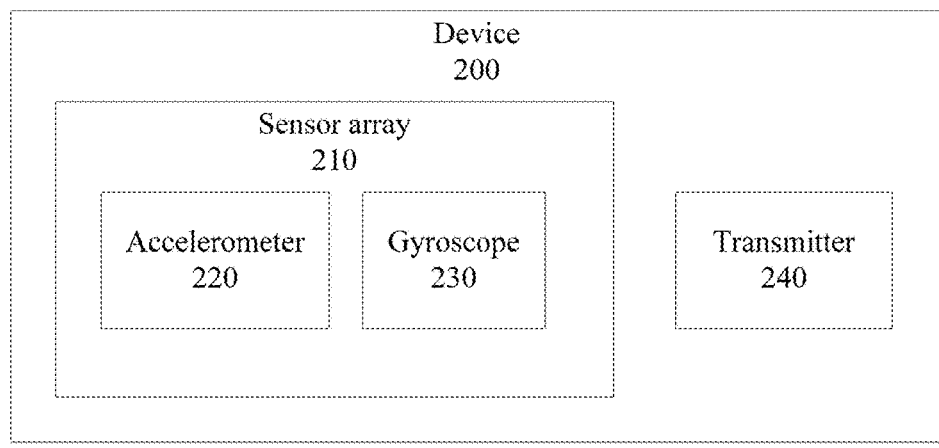
FIG. 1 is a schematic representation of a device for use in a system according to the disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The ability to use one's smartphone or tablet or other electronic device to detect motion of a user's foot by strapping it to the user's shoes using, for example, a strap, cradle, or customized boot, allows sensors in the smartphone or tablet to detect motion of the user's feet. Alternatively, the smartphone or tablet or other device may be strapped onto a balance board in order to detect motion of the board applied by the user's foot.

The system described is designed for hand-tracking inclusive virtual reality applications and uses a combination of software and existing household devices to facilitate the control of a virtual avatar in a video game or other software application using a user's feet, specifically the system provides for forward and backward movement of an avatar, strafing, rotation, jumping, and crouching. Other motions are contemplated as well, such as rolling, flying, swimming, or controlling a vehicle. Foot control, as opposed to more traditional video game control systems, frees the user's hands to naturally interact with their virtual environment using any hand-tracking technology, unencumbered by controllers or mouse-and-keyboard configurations.

Figure 2:
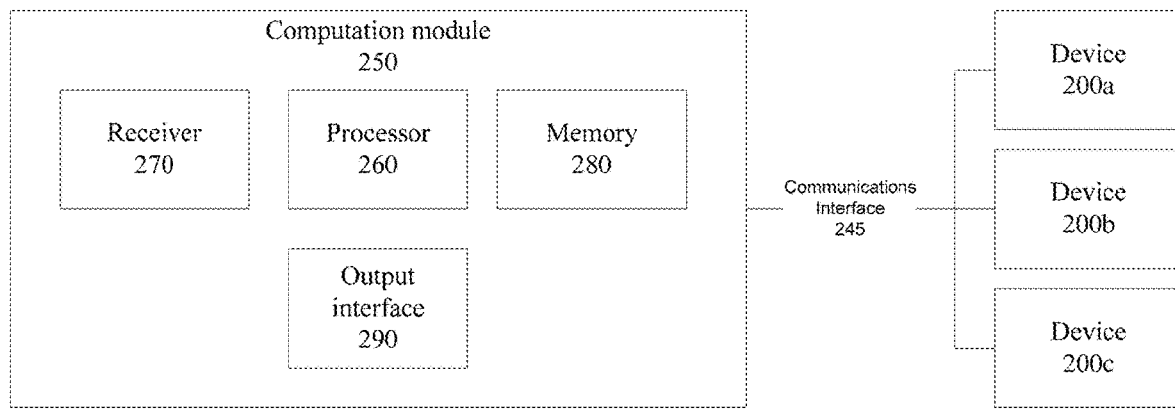
FIG. 2 is a schematic representation of a system according to the disclosure incorporating the device of FIG. 1.

FIG. 1 shows a schematic representation of device 200, such as a smartphone or tablet, that can be used to implement the system described and FIG. 2 shows a system, including the device 200 and a computation module 250, for implementing the methods described. As shown, the device 100 has a sensor array 210 comprising a three axis accelerometer 220 for detecting orientation of the device 200 in various directions and a three axis gyroscope 230 for detecting rotation of the device along each of the axes. It will be understood that these sensors may be replaced with separate single axis devices, or may be incorporated as part of larger chipsets including a variety of different sensors. Additional sensors are contemplated as well, such as depth sensors utilized to determine a position of a user's foot relative to a surface or object.

In some embodiments, the device 200 may not contain a sensor necessary for a control scheme to be implemented. In such an embodiment, a standalone sensor or package of sensors may be provided to interface with the device 200 and generate the additional data. For example, if a user has a smartphone that does not include a depth sensor and would like to utilize a control scheme requiring such a sensor, a standalone depth sensor may be mated with the device 200 and utilized as part of the control scheme.

In some embodiments, these additional sensors may be provided as part of a balance board or foot strap, such as those described below with respect to FIGS. 5-8.

A system incorporating the device 200 further comprises a communications interface 245, utilizing a transmitter 240 of the device 200, for wirelessly communicating with a computer network. The communications interface 245 may, for example, be a home Wi-Fi network such that the device 200 is on the same network as a computer or gaming console or other computation module 250 for which the device 200 is being used as a controller.

The network communication interface 245 may include a server or other additional components, or it may simply provide a link between the device 200 and a gaming console. As shown, multiple devices 200a-c may be provided to implement multiplayer gaming on a single computer or gaming console or other computation module 250. In other embodiments, only one device 200 may be connected to the computation module 250.

A computation module 250, also referred to as a computing device, implementing the method described below contains a receiver 270 for receiving information from the communications interface 245, a processor 260 for implementing instructions with respect to the information received and a memory 280 for storing instructions for implementing the method described. The computation module 250 would further comprise an output interface 290 for outputting the results of the method. Where the computation module 250 is a gaming system, the output may be directly to a display for displaying the results of a control scheme implemented. Where the computation module 250 is a server, the output may be instructions to a gaming system or other computer for controlling an avatar.

In some embodiments, the computing device is a virtual reality headset and the output is to the headset display and may be displayed from the perspective of the user's avatar. In some embodiments, systems may further include detectors for detecting motion of a user's hands while the controller 200 is fixed to the user's foot. In such an embodiment, the methods below may be used to determine overall motion of an avatar, while the detector may determine the movement and activity of a user's hands.

Figure 3:
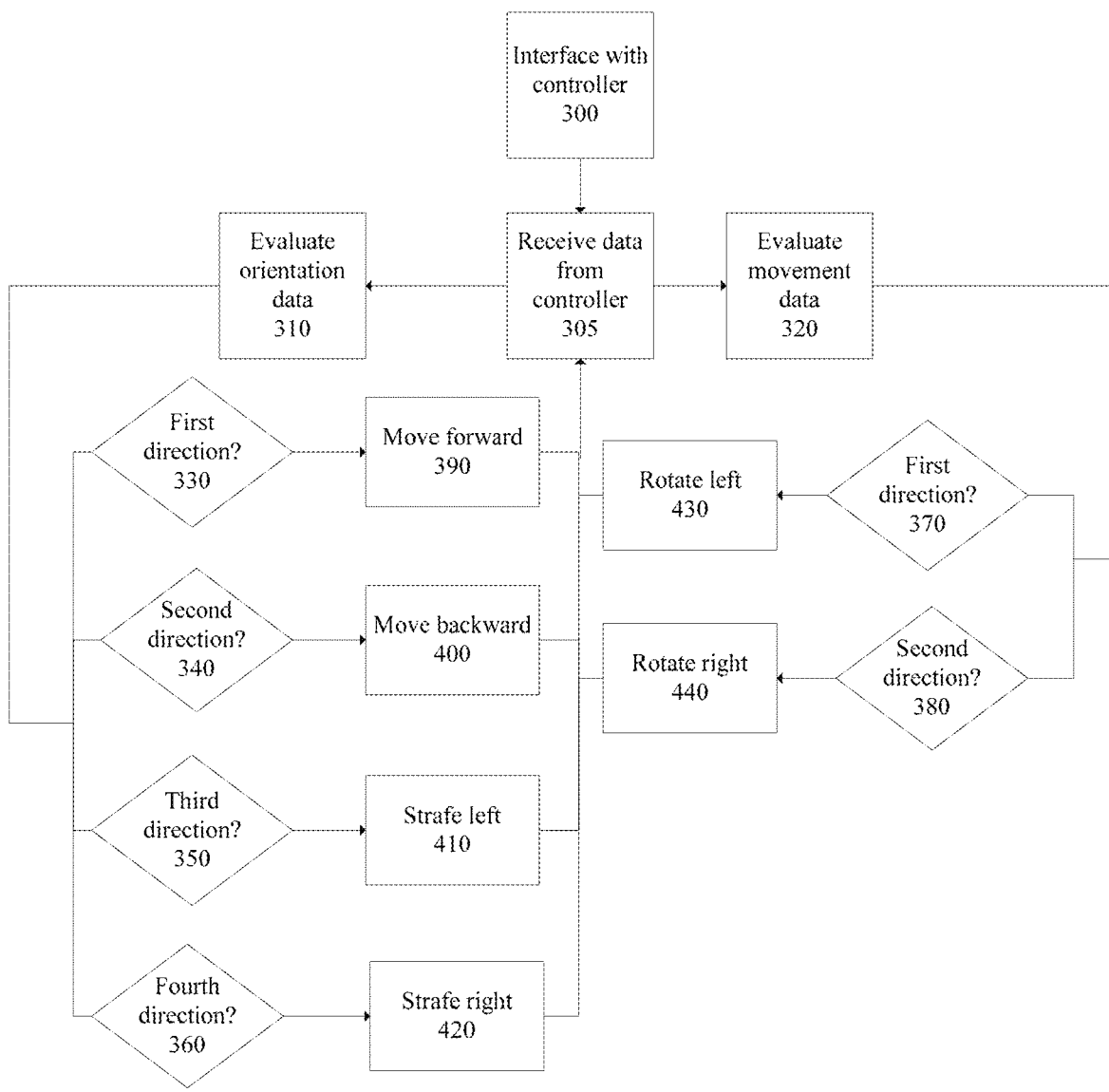
FIG. 3 is a flowchart showing a method for controlling an avatar according to the disclosure.

FIG. 3 is a flowchart showing a method for controlling an avatar in a virtual environment.

Typically, the method, implemented by a computation module 250, comprises interfacing with a controller 200 (300) and receiving data from that controller (305). In order to interface, the computation module 250 must first form a connection with the controller 305.

The computation module 250 then evaluates orientation data 310 received as part of the data, the orientation data typically comprising the output of the accelerometer 220 of the controller 200, as well as movement data 320, the movement data typically comprising the output of the gyroscope 230. The orientation data (received at 310) provides information related to the orientation of the controller 200 and the movement data (received at 320) represents dynamic information, such as rotation information for the controller 200.

After evaluating the orientation data (at 310) the computation module 250 determines if the data represents the movement of the controller 200. The movement of the controller 200 typically functions as a proxy for the movement of a foot, as shown below with respect to FIGS. 5-8, and as such the movement of the controller corresponds to movement of the user's foot.

Accordingly, the data orientation data is evaluated to determine if it represents movement in a first direction (330), such as the tilting of a foot forward, and if so, it moves the avatar forward (390) in its virtual environment. This determination is made by evaluating whether the orientation data represents a deviation from an initial orientation by a threshold amount in the first direction (330). Therefore, if a user is initially sitting with his foot at a 30 degree angle to the floor with his toes above the floor, the user would move his toes towards the floor to move his avatar forward. If the movement is by more than a threshold amount, which is set to eliminate unintended movement, his avatar will move forward (390).

Similarly, if the move pulls his toes upward, away from a floor, the orientation data will show a deviation from the initial orientation in a second direction (340) opposite the first direction. Accordingly, the computation module 250 will move the avatar in a second direction opposite the forward direction in the virtual environment. If movement in the first direction (330) moved the avatar forwards, movement in the second direction (340) greater than the threshold amount will result in moving the avatar backwards (400).

If the orientation data shows that the device 200 was moved in a third direction (350) perpendicular to the first and second directions, such as by a user rocking his foot to the left, and that the movement was greater than a threshold amount, the avatar is translated to its left (410) by strafing, for example. Similarly, if the data shows movement in a fourth direction (360) opposite the third direction, the avatar will translate or strafe to its right (420).

Separately, the computation module evaluates movement data (320) and determines if the data, typically from a gyroscope, shows rotational movement. If the data shows that a user rotated his foot in a first direction (370), such as to the left, the avatar will be rotated to its left (430). Similarly, if the user rotates his foot in a second direction (380), to his right, the avatar will be rotated right (440). These movements may, in some embodiments, be applied only if the movement registered is greater than a threshold amount or velocity.

After evaluating the data from the controller 200 and applying any movement to a corresponding avatar, the computation module 250 begins the process again and continues to receive data from the controller (305). Accordingly, if a user maintains his foot at a particular angle, his avatar would continue to move in the direction corresponding to that angle. Typically, a speed at which the avatar moves may be defined by the amount of deviation from an initial orientation, such that a greater angle would result in an avatar moving at greater velocity. The correspondence between the angle and the resulting velocity, or a ramp value, may be set by a user or may be based on system defaults.

Figure 4:
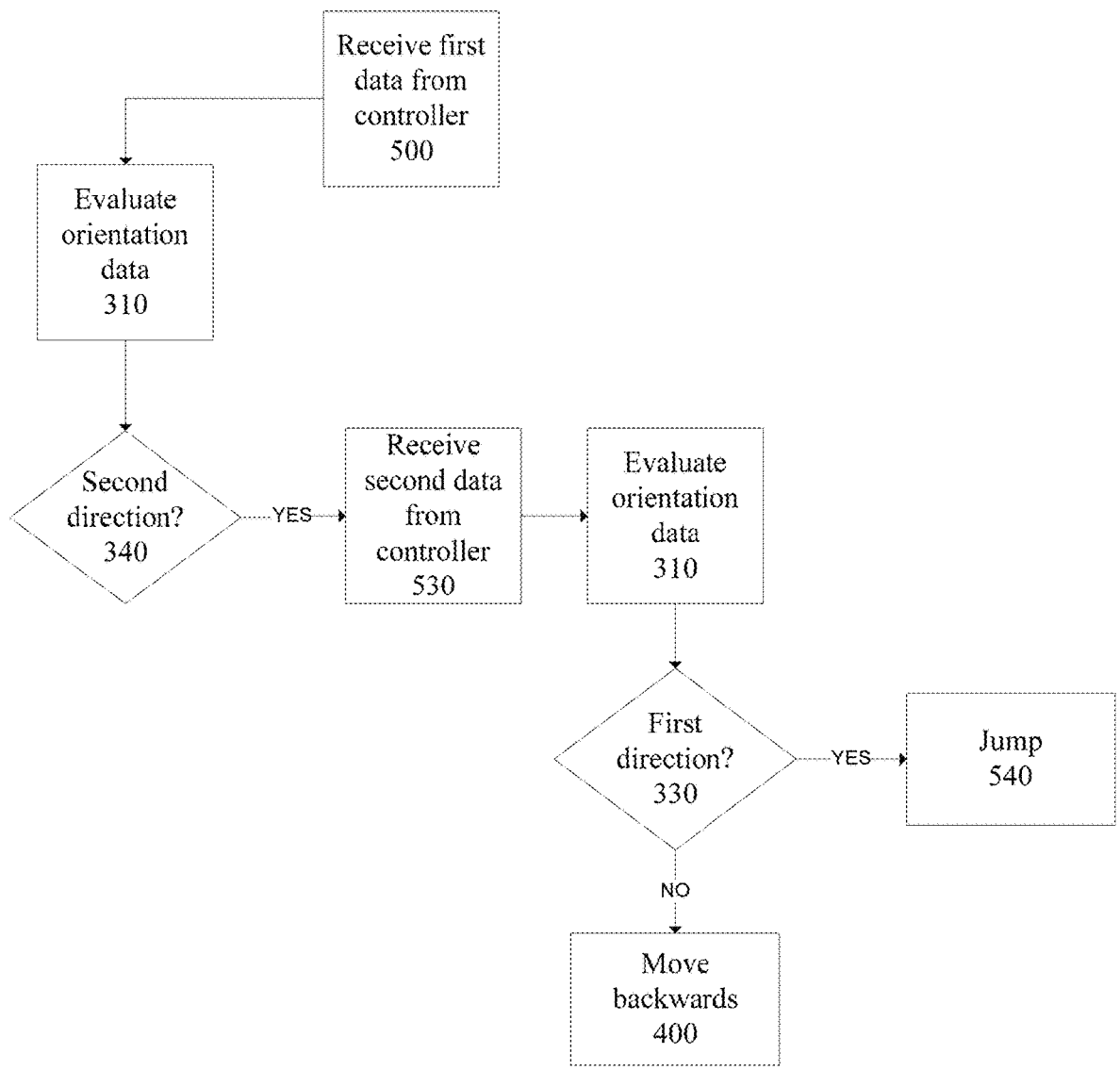
FIG. 4 is a flowchart showing a use scenario used as part of the method of FIG. 3.

In some embodiments, special use scenarios may be implemented allowing users to have their avatars take actions other than those already described. FIG. 4 is a flowchart showing one such use scenario, used to have an avatar jump. While receiving orientation data from a controller (500) in an implementation where the computation module 250 continuously receives such data, the computation module receives a first data set from the controller (500) and evaluates the orientation data (510) in the first data set. It then determines if the orientation data (510) shows movement in the second direction (340) (typically backwards). If so, it continues to receive data and receives a second data set from the controller 200 (530) and evaluates orientation data (310) from that second data set. If the second data set shows movement in the first direction (330), then the users avatar will jump (540) in the first direction. If not, it will move backwards in response to the first data set (500). Typically, a jump command will only be implemented if the first data set (500) and the second data set (530) are received within a predetermined time period of each other.

Similar methods may be applied in order to have an avatar jump in different directions, such that whenever the orientation data shows movement in opposite directions within a threshold amount of time, an avatar jumps in the direction of the second movement.

In the methods described, the controller 200 typically transmits a continuous stream of data to the computation module 250. These streams of data typically contain accelerometer data and gyroscope data.

Figure 5:
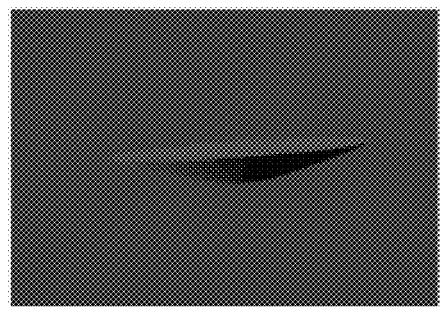
FIG. 5 is balance board for supporting the device of FIG. 1.

FIG. 5 is balance board for supporting the device 100 of FIG. 1. Such a balance board may be provided with a port for supporting and interfacing with the device 100, and it may include hardware for providing additional sensor data to the device.

Figure 6A:
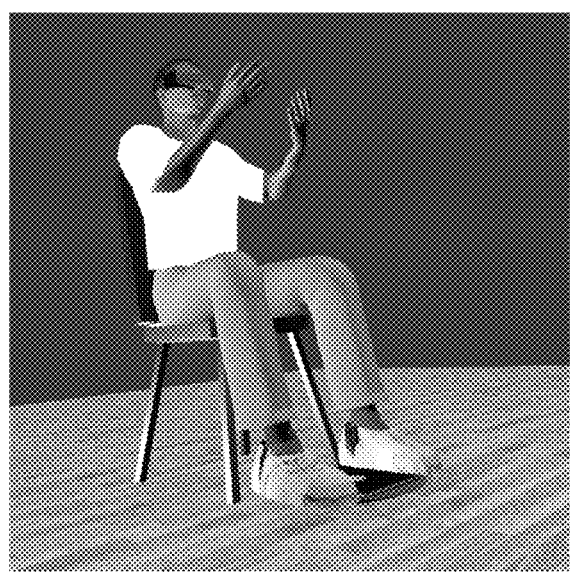
FIGS. 6A-C show a user using the device of FIG. 1 with the balance board of FIG. 5.
Figure 6B:
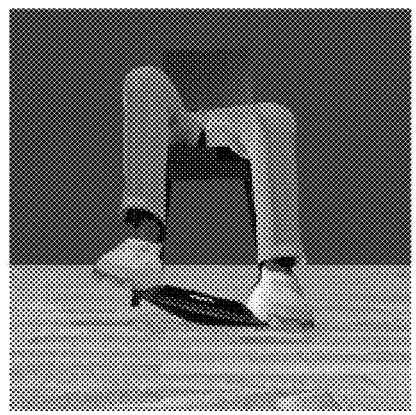
Figure 6C:
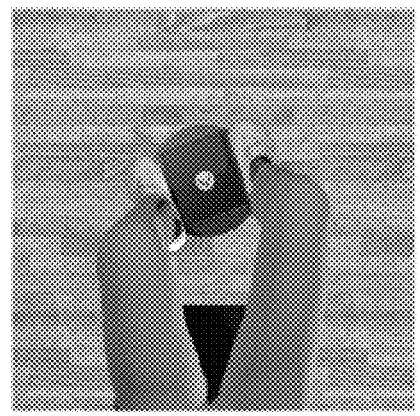

FIGS. 6A-C show a user using the device 100 of FIG. 1 with the balance board of FIG. 5.

Figure 7:
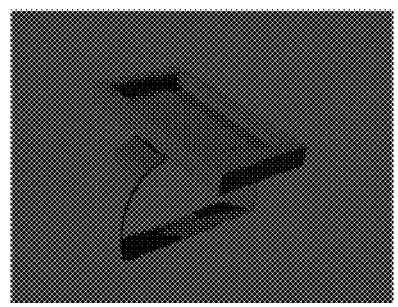
FIG. 7 shows a strap for use with the device of FIG. 1.

FIG. 7 shows a strap for use with the device 100 of FIG. 1. As shown, the strap includes a port for interfacing with the device 100. Such a strap may be used to fix the device 100 to a user's foot.

Figure 8A:
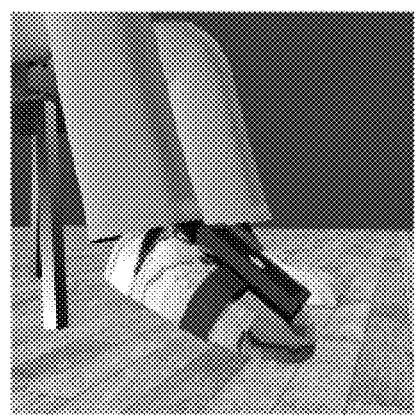
FIGS. 8A-B show a user using the device of FIG. 1 with the strap of FIG. 7.
Figure 8B:
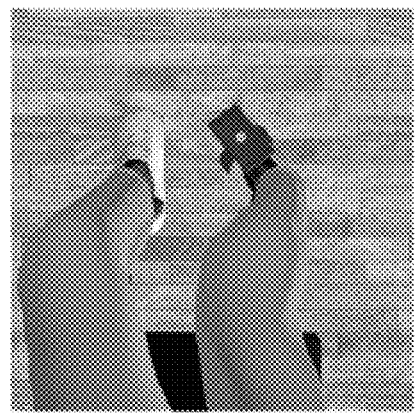

FIGS. 8A-B show a user using the device 100 of FIG. 1 with the strap of FIG. 7.

Once relevant applications, described in more detail below, are loaded and the user's smartphone or tablet is attached to (or otherwise controlled by) a user's feet, if the user tilts the smartphone or tablet attached to their foot forward, left, right or backward, their corresponding avatar moves in that direction at a speed based on the angle of tilt; if they rotate their foot left or right, their avatar rotates clockwise or counter-clockwise at a speed relative to the angle of rotation. Jumping is accomplished by quickly "flipping" the device back and forth, which propels the user in the direction of the latter flip. Crouching may be initiated from a separate hardware device, such as by detecting when the user's head is below a certain level using sensor's in the virtual reality device's positional tracker. This may include virtual reality headsets that detect a height of the headset.

To use the system, a user would typically be seated in a chair; the user would then place their electronic device 200 running the software client application onto a balance board, or attach it to their foot with an exercise strap, and the accelerometers and gyroscopes within the device then detect their foot's tilt and rotation, respectively, then send those values over the local wireless network to a device running a third party software application that has incorporated the system's control scheme into its character controller code. After device 200 signifies its connection to the server 250 by, for example, flashing a green light, the user is able to see the tilt and rotation of their foot or feet translated into motion commands within the third party software application, and can easily navigate a virtual space without the use of their hands. This is particularly useful when used in conjunction with hand-tracking inclusive virtual reality applications, which require the user's hands to be unencumbered by controllers or mouse-and-key configurations.

The system described includes two distinct software components. The first software component is a program that runs on the user's device 200 and transmits sensor data to a server, computer, or gaming machine 250, and the second software component is embedded into application code incorporated into the software for which the device 200 is being used as a controller. In order to use the system, a user typically downloads the software application to the device 200 using, for example, a device specific app store. In one embodiment, the user interface for the first software component, an application running on the device 200, is a single digital button or switch used to connect or disconnect from the local server. In other embodiments, the first software component provides a menu for controlling aspects of the control scheme being used, or other software features.

Once the first software component is running on the user's smartphone or tablet, the first software component begins to cache the device's 200 accelerometer 220 and gyroscope 230 data, which, when connected to the local network 245, is sent over the local wireless network to the computer 250 running the software incorporating the second software component. The software incorporating the second software component then discovers the smartphone or tablet running the first software component and, if connected, begins receiving the cached accelerometer 220 and gyroscope 230 data. The second software component then translates the cached data and translates it into motion in a game environment or virtual space generated by the software incorporating the second software component.

The motion is defined by several adjustable but typically predefined values: speed of the motion is the rate at which the user's avatar is moved through the virtual space (how fast they move) and is defined by an angle of tilt or rotation determined based on the cached accelerometer 220 and gyroscope 230 data. The speed is evaluated based on ramping of that value beyond an initial threshold amount. The threshold amount, or target value, is a value that initiates corresponding action within the virtual space. Accordingly, when the device 200 is tilted beyond a threshold angle, an avatar may begin to move in the direction of the tilt. Ramping defines the rate of change of an avatars speed as it correlates with the rate of change of the tilt beyond the threshold amount.

Accordingly, the threshold value defines how much tilt or rotation is required to trigger motion within the virtual world, while the ramp defines how much to increase the speed of the motion based on further tilting or rotation beyond the threshold amount. This system allows a user to comfortably navigate a virtual environment while retaining the full use of their hands within both real and virtual space, making for an extremely immersive virtual reality experience without additional hardware.

In some embodiments, such as those in which the first software component provides a menu for controlling aspects of the control scheme on the device 200, a user may be able to adjust the threshold value or a rate of ramping in the software from the device 200 itself. In such an embodiment, the second software component may receive indications from the first software component defining a newly modified threshold value or ramping rate. Alternatively, in some embodiments, the first software component may modify the sensor output cached and transmitted to the network 245 in order to reflect the new threshold values or modified ramp rate. Other software options may be provided as well, such as control schemes that allow a user to initiate a movement by tilting the device 200 to a desired angle and then applying a software "lock" so that the device need not be maintained at that angle. Such a feature may be useful in the case of walking or running through a virtual environment.

In some embodiments, a system may comprise several devices 200a-c each of which connect to the same computer or gaming console 250. In such a way, multiple players within a single game environment may be able to interact simultaneously.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" and like terms encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for controlling an avatar in a virtual environment, the method comprising:
   receiving orientation data representing orientation information for a controller manipulated by a user;
   receiving movement data representing dynamic information for the controller;
   evaluating at least one of the orientation data and the movement data; and
      moving the avatar in a forward direction or in a direction opposite the forward direction, or translating the avatar to its left or right in the virtual environment based on the orientation data; or
      rotating the avatar to its left or right in the virtual environment based on the movement data, and
      receiving the orientation data over time and instructing the avatar to jump forward in the virtual environment if the orientation data represents a deviation from an initial orientation by at least a threshold amount in a first direction followed by a deviation from the initial orientation by at least the threshold amount in a second direction within a predetermined time period.

2. The method of claim 1 wherein the controller is a smartphone.

3. The method of claim 1 wherein the controller is fixable to a user's foot.

4. The method of claim 1 wherein the orientation data is received from an accelerometer and wherein the movement data is received from a gyroscope.

5. The method of claim 1 wherein a speed assigned to the avatar in the virtual environment is determined by the amount by which the orientation data deviates from the initial orientation or the movement data exceeds the threshold amount.

6. A system for controlling an avatar in a virtual environment, the system comprising:
   a controller;
   a computing device in communication with the controller for displaying a virtual environment containing an avatar; and
   a balance board having a substantially planar upper surface and a lower surface having a convex shape, the upper surface having a docking location for the controller, and
   wherein the computing device contains a processor for generating and displaying the virtual environment and for controlling the avatar based on data received from the controller and a memory for storing instructions for controlling the avatar, and wherein the computing device:
      receives orientation data representing orientation information of the controller;
      receives movement data representing dynamic information of the controller;
      evaluates at least one of the orientation data and the movement data; and
         moves the avatar in a forward direction or in a direction opposite the forward direction, or translates the avatar to its left or right in the virtual environment based on the orientation data; or
         rotates the avatar to its left or right in the virtual environment based on the movement data.

7. The system of claim 6 wherein the controller is a smartphone.

8. The system of claim 6 further comprising a detector for detecting motion of a user's hand, and wherein the controller detects motion of a user's foot.

9. The system of claim 8 wherein the computing device receives hand data from the detector and moves the avatar's hands based on the hand data.

10. A system for controlling an avatar in a virtual environment, the system comprising:
    a controller;
    a computing device in communication with the controller for displaying a virtual environment containing an avatar; and
    a strap assembly for locating the controller on or adjacent a top surface of a foot of a user,
    wherein the strap assembly comprises a rigid docking location for locating the controller and a flexible strap for fixing the docking location to the foot of the user, and
    wherein the computing device contains a processor for generating and displaying the virtual environment and for controlling the avatar based on data received from the controller and a memory for storing instructions for controlling the avatar, and wherein the computing device:
       receives orientation data representing orientation information of the controller;
       receives movement data representing dynamic information of the controller;
       evaluates at least one of the orientation data and the movement data; and
          moves the avatar in a forward direction or in a direction opposite the forward direction, or translates the avatar to its left or right in the virtual environment based on the orientation data; or rotates the avatar to its left or right in the virtual environment based on the movement data.

11. The system of claim 10 further comprising a detector for detecting motion of a user's hand, and wherein the controller detects motion of a user's foot.

12. The system of claim 11 wherein the computing device receives hand data from the detector and moves the avatar's hands based on the hand data.

\* \* \* \* \*